United States Patent
Shinozaki et al.

(10) Patent No.: US 9,722,486 B2
(45) Date of Patent: Aug. 1, 2017

(54) PROTECTION CIRCUIT

(71) Applicant: ROHM CO., LTD., Ukyo-Ku, Kyoto (JP)

(72) Inventors: Yuichi Shinozaki, Kyoto (JP); Isao Yamamoto, Kyoto (JP); Shinya Karasawa, Kyoto (JP); Shigenobu Shimohagi, Kyoto (JP); Jun Maede, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 27 days.

(21) Appl. No.: 14/834,931

(22) Filed: Aug. 25, 2015

(65) Prior Publication Data
US 2016/0065052 A1 Mar. 3, 2016

(30) Foreign Application Priority Data
Aug. 28, 2014 (JP) .................. 2014-174453

(51) Int. Cl.
*H02M 1/32* (2007.01)
*H02M 1/44* (2007.01)
*H02M 3/156* (2006.01)
*H02M 3/158* (2006.01)
*G06F 12/14* (2006.01)

(52) U.S. Cl.
CPC .......... *H02M 1/32* (2013.01); *G06F 12/1475* (2013.01); *H02M 3/156* (2013.01); *G06F 2212/1052* (2013.01)

(58) Field of Classification Search
CPC .......... H02M 1/32; H02M 1/44; H02M 3/156; H02M 3/157; H02M 3/158; H02M 3/1588; G06F 12/1475; G06F 2212/1052
See application file for complete search history.

(56) References Cited

U.S. PATENT DOCUMENTS

| 6,754,765 B1* | 6/2004 | Chang ................ G06F 8/65 711/103 |
| 9,337,730 B2* | 5/2016 | Hoshino .............. H02M 3/157 |
| 2010/0123978 A1* | 5/2010 | Lin .................... H02H 7/1213 361/18 |
| 2012/0268085 A1* | 10/2012 | Lee .................... H02M 3/158 323/234 |
| 2013/0043833 A1* | 2/2013 | Katz .................... H02J 7/025 320/108 |
| 2013/0046917 A1* | 2/2013 | Yang .................. G06F 12/0246 711/103 |

(Continued)

FOREIGN PATENT DOCUMENTS

JP 2007006663 A 1/2007
JP 2007336620 A 12/2007

*Primary Examiner* — Adolf Berhane
*Assistant Examiner* — Sisay G Tiku
(74) *Attorney, Agent, or Firm* — Cantor Colburn LLP

(57) ABSTRACT

A first detector compares an electric signal to be monitored with a first threshold. A second detector compares the electric signal with a second threshold. A first memory stores setting data of the first threshold. A second memory stores setting data of the second threshold. An interface circuit receives data from an external processor, and writes the data thus received to the first memory and the second memory. The protection circuit is configured such that data writing to the first memory is possible only when a predetermined condition is satisfied.

14 Claims, 8 Drawing Sheets

(56) References Cited

U.S. PATENT DOCUMENTS

| | | | | |
|---|---|---|---|---|
| 2013/0336010 A1* | 12/2013 | Saxena | ............... | H02M 1/12 |
| | | | | 363/13 |
| 2014/0035533 A1* | 2/2014 | Akaho | ............... | H02J 7/009 |
| | | | | 320/134 |
| 2016/0072322 A1* | 3/2016 | Yoshimatsu | ......... | H02J 7/0086 |
| | | | | 320/164 |

* cited by examiner

PROTECTION CIRCUIT

CROSS-REFERENCE TO RELATED APPLICATIONS

This application is based upon and claims the benefit of priority from the prior Japanese Patent Application No. 2014-174453, filed Aug. 28, 2014, the entire contents of which are incorporated herein by reference.

BACKGROUND OF THE INVENTION

Field of the Invention

The present invention relates to a protection circuit.

Description of the Related Art

In order to protect components that form a semiconductor circuit, various kinds of protection circuits are provided. Examples of such a protection circuit include: an overvoltage protection circuit configured to provide a circuit component with overvoltage protection; an overcurrent protection circuit configured to provide a circuit component with overcurrent protection, and the like. In addition, such protection circuit examples can be said to include a UVLO (Under Voltage LockOut) circuit that detects a UVLO condition in order to prevent a circuit from operating abnormally in a low voltage condition.

For example, an overcurrent protection circuit detects a current that flows through a circuit element to be protected, and compares the current thus detected with a predetermined threshold. When the detected current exceeds the threshold, protection processing is executed, examples of which include circuit operation suspension, current disconnection, and the like.

In some cases, multiple thresholds are set for such a protection circuit, in order to provide multilevel protection. For example, an overcurrent protection circuit mounted on a control circuit of a switching circuit detects a current that flows through a coil or a switching transistor. With such an arrangement, when the detected current exceeds a first threshold $I_{TH1}$, the overcurrent protection circuit suspends the switching operation of the switching transistor in units defined by its switching period. When the detected current exceeds a second threshold $I_{TH2}$ that is higher than the first threshold $I_{TH1}$, the overcurrent protection circuit completely suspends the switching operation of the switching transistor M1.

In some cases, multiple desired thresholds are preferably set for such a protection circuit via an external circuit. FIG. 1 is a circuit diagram showing a protection circuit investigated by the present inventors. A protection circuit 40 is configured as an overcurrent protection circuit for a DC/DC converter. The protection circuit 40 is built into a control circuit 10. The control circuit 10 forms a switching power supply circuit (which will simply be referred to as the "power supply circuit") 2 together with an output circuit 20. The output circuit 20 includes a switching circuit 102, an inductor L1, an output capacitor C1, and resistors R11 and R12.

The control circuit 10 includes a switching circuit 102. In addition, the control circuit 10 further includes a controller 104 that controls the switching circuit 102, and an overcurrent protection circuit 40. A feedback voltage $V_{FB}$ that corresponds to an output voltage $V_{OUT}$ is input to a feedback (FB) terminal of the control circuit 10.

The controller 104 adjusts the duty ratio that is supplied to a high-side transistor MH and a low-side transistor ML of the switching circuit 102 such that the feedback voltage $V_{FB}$ matches a predetermined target voltage.

The overcurrent protection circuit 40 detects a current $I_S$ that flows through the output circuit 20, and compares the current $I_S$ thus detected with multiple thresholds $I_{TH1}$ and $I_{TH2}$. The overcurrent protection circuit 40 includes a first detector 402, a second detector 404, a first memory 406, a second memory 408, and an interface circuit 410.

The first memory 406 and the second memory 408 store setting data D1 that indicates the first threshold $I_{TH1}$ and setting data D2 that indicates the second threshold $I_{TH2}$, respectively. The first detector 402 compares the detected current $I_S$ with the threshold $I_{TH1}$ that corresponds to the setting data D1 stored in the first memory 406. The second detector 404 compares the detected current $I_S$ with the threshold $I_{TH2}$ that corresponds to the setting data D2 stored in the second memory 408. The interface circuit 410 receives the setting data D1 and D2 from an external processor, and writes the setting data D1 and D2 thus received in the first memory 406 and the second memory 408, respectively. The controller 104 performs protection processing that is changed according to the detection results provided by the first detector 402 and the second detector 404.

It should be noted that the overcurrent protection circuit 40 shown in FIG. 1 and the control circuit 10 including such an overcurrent protection circuit 40 should not be regarded as conventional techniques (Prior Art).

As a result obtained by investigating such a protection circuit, the present inventor has come to recognize the following problem.

In the overcurrent protection circuit 40 shown in FIG. 1, the first memory 406 and the second memory 408 are configured as memory spaces defined in the same sector in a single memory unit mounted on a single chip. For example, the first memory 406 and the second memory 408 may be defined as adjacent addresses. In this case, the processor 4 writes the setting data D1 and D2 to the corresponding memory 406 and 408 at substantially the same time in a single writing sequence.

Accordingly, in a case in which transmission error occurs in the writing sequence, the interface circuit 410 has the potential to receive false values with respect to both the setting data D1 and D2. Also, in a case in which the first memory 406 and the second memory 408 are exposed to strong electromagnetic noise or cosmic rays in the writing sequence or after the writing sequence, such an arrangement has the potential to store false values even if the interface circuit 410 has received the setting data D1 and D2 normally.

As described above, with the overcurrent protection circuit 40 shown in FIG. 1, there is a risk of losing the multiple protection functions provided by the first detector 402 and the second detector 404 at the same time due to a single error-generating factor.

SUMMARY OF THE INVENTION

An embodiment of the present invention is made in order to solve such a problem. Accordingly, it is an exemplary purpose of an embodiment of the present invention to provide a protection circuit with improved robustness.

An embodiment of the present invention relates to a protection circuit. The protection circuit comprises: a first detector that compares an electric signal to be monitored with a first threshold; a second detector that compares the electric signal with a second threshold; a first memory that stores setting data of the first threshold; a second memory that stores setting data of the second threshold; and an interface circuit that receives data from an external processor, and writes the data thus received to the first memory and the second memory. The protection circuit is configured such that data writing to the first memory is possible only when a predetermined condition is satisfied.

Such an embodiment does not permit data writing for the first memory and the second memory at the same time. Thus, such an arrangement is capable of preventing the two setting data to be used to set the two thresholds from both being written abnormally to the first memory and the second memory as false values due to a single error-generating factor. Such an arrangement is capable of protecting the two detectors from loosing their functions at the same time, thereby providing improved robustness.

In one embodiment, the protection circuit may further comprise a state machine which is set to a permission mode when the predetermined condition is satisfied, and which is set to a prohibition mode when the predetermined condition is not satisfied. With such an arrangement, access to the first memory may be permitted or otherwise prohibited according to the mode.

Also, the state machine may transit to the permission mode upon reception of predetermined control data from the processor.

With such an arrangement, it becomes temporarily possible for the processor to write the setting data to the first memory only after the mode is switched according to the control data transmission operation of the processor. Thus, such an arrangement is capable of preventing the processor from accessing the first memory and the second memory at the same time.

Also, when the processor writes data to the second memory, the state machine may transit to the permission mode.

With such an arrangement, access to the first memory is prohibited before the completion of the data writing to the second memory. Thus, such an arrangement is capable of preventing the first memory and the second memory from being accessed at the same time.

Also, the first memory and the second memory may be laid out on a semiconductor substrate on which the protection circuit is integrated, such that the first memory and the second memory are physically distant from each other.

By arranging the first memory and the second memory such that they are physically distant from each other, such an arrangement is capable of reducing the probability of the setting data stored in the first memory and the setting data stored in the second memory both being destroyed at the same time due to external factors such as electromagnetic noise or cosmic rays.

Also, the first memory and the second memory may be respectively integrated on separate semiconductor substrates (chips). Such an arrangement is capable of reducing the probability of the setting data stored in the first memory and the setting data stored in the second memory both being destroyed at the same time due to external factors such as electromagnetic noise or cosmic rays.

Also, the first memory and the second memory may be respectively subject to different power supply lines. Such an arrangement is capable of preventing the data stored in the first memory and the data stored in the second memory from both being destroyed at the same time due to noise received via a power supply line or a ground line.

Another embodiment of the present invention also relates to a protection circuit. The protection circuit comprises: a first detector that compares an electric signal with a first threshold; a second detector that compares the electric signal with a second threshold; a first memory that stores setting data of the first threshold; a second memory that stores setting data of the second threshold; and an interface circuit that receives data from an external processor, and writes the data thus received to the first memory and the second memory. The protection circuit is configured such that different procedures are required for the processor writing the setting data to the first memory and for the processor writing the setting data to the second memory.

Yet another embodiment of the present invention also relates to a protection circuit. The the protection circuit is configured such that a series of sequential data writing instructions for both the first memory and the second memory is not possible.

Yet another embodiment of the present invention also relates to a protection circuit. With the protection circuit, the the write operations to the first memory and the second memory occur exclusively.

Yet another embodiment of the present invention also relates to a protection circuit. The protection circuit comprises: a first detector that compares an electric signal with a first threshold; a second detector that compares the electric signal with a second threshold; a first memory that stores setting data of the first threshold; a second memory that stores setting data of the second threshold; and an interface circuit that receives data from an external processor, and writes the data thus received to the first memory and the second memory. The first memory and the second memory are laid out on a semiconductor substrate on which the protection circuit is integrated, such that the first memory and the second memory are physically distant from each other.

Also, the protection circuit may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Yet another embodiment of the present invention relates to a control circuit for a switching power supply. The control circuit may comprise: a switching controller that controls a switching element of the switching power supply; and any one of the aforementioned protection circuit.

Also, the the protection circuit may be configured as an overcurrent protection circuit. Also, the electric signal to be monitored by the protection circuit may be a current that flows through the switching power supply.

Also, the protection circuit may be configured as an overvoltage protection circuit. Also, the electric signal to be monitored by the protection circuit may be an output voltage of the switching power supply.

Yet another embodiment of the present invention relates to a switching power supply. The switching power supply comprises: an output circuit comprising at least a switching element, an inductor, and an output line that outputs a DC output voltage according to a switching operation of the switching element; and a control circuit that controls the switching element according to the output voltage.

Yet another embodiment of the present invention relates to an electronic device. The electronic device includes the aforementioned digital control power supply circuit.

Yet another embodiment of the present invention relates to a mobile communication base station. The base station includes the aforementioned digital control power supply circuit.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 2:
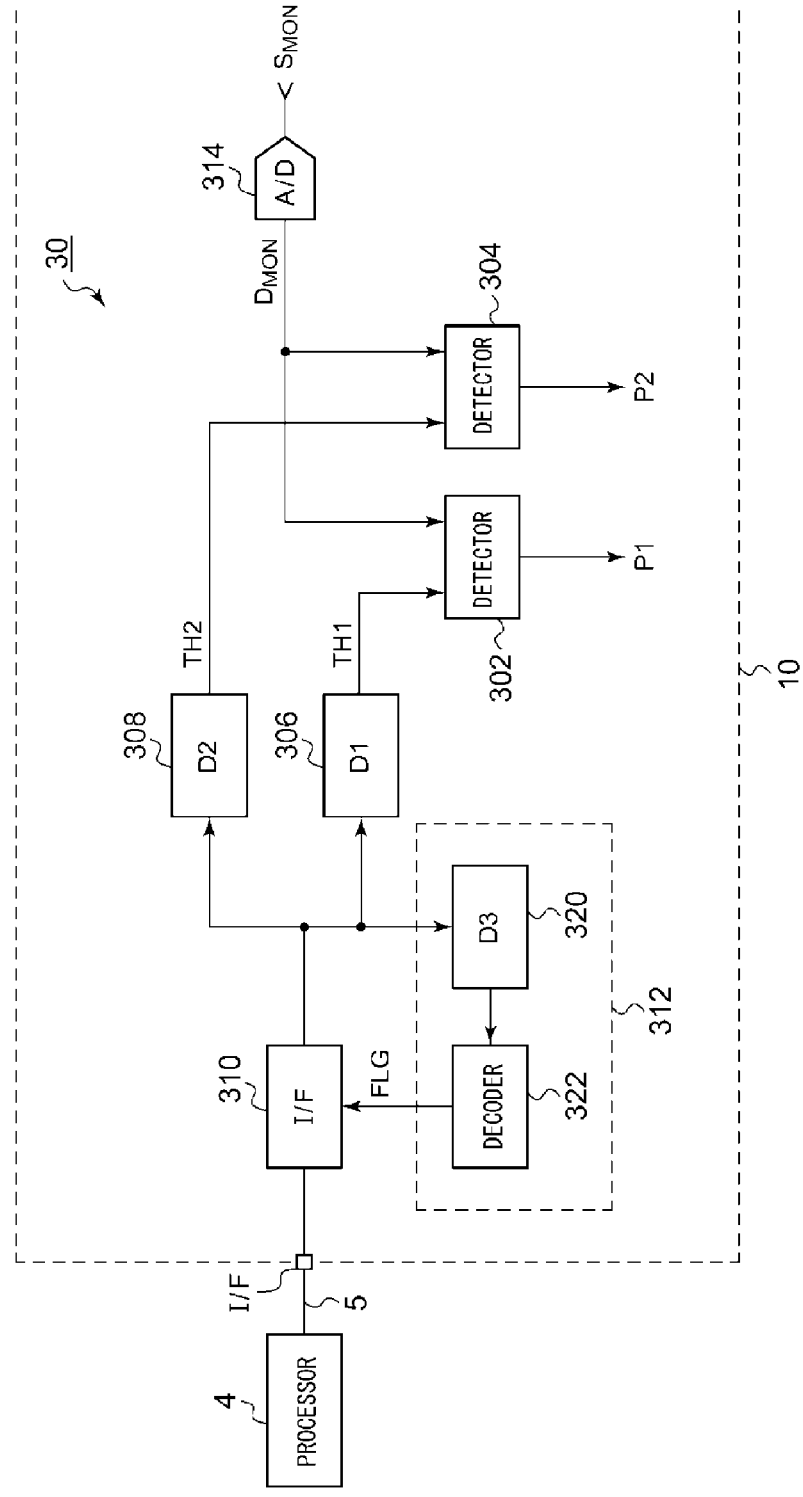
FIG. 2 is a circuit diagram showing a protection circuit according to an embodiment.

FIG. 2 is a circuit diagram showing a protection circuit 30 according to an embodiment.

The protection circuit 30 includes a first detector 302, a second detector 304, a first memory 306, a second memory 308, an interface circuit 310, a state machine 312, and an A/D converter 314.

The first detector 302 compares an electric signal $S_{MON}$ to be monitored with a first threshold TH1. When the comparison result satisfies a predetermined magnitude relation, the first detector 302 asserts a first protection signal P1. The second detector 304 compares the same electric signal $S_{MON}$ with a second threshold TH2. When the comparison result satisfies a predetermined magnitude relation, the second detector 304 asserts a second protection signal P2. In the present embodiment, the electric signal $S_{MON}$ is converted by the A/D converter 314 into digital data $D_{MON}$. The first detector 302 and the second detector 304 each make a comparison between an electric signal and a threshold in a digital manner.

The first memory 306 stores the setting data (which will also be referred to as the "first setting data") D1 that represents the first threshold TH1. The second memory 308 stores the setting data (which will also be referred to as the "second setting data") D2 that represents the second threshold TH2. The memory may be configured as a register, RAM (Random Access Memory), or nonvolatile memory.

The protection circuit 30 is monolithically integrated on a single semiconductor substrate 32. The first memory 306 and the second memory 308 are laid out such that they are physically distant from each other on the semiconductor substrate 32 on which the protection circuit 30 is integrated.

The interface circuit 310 receives data from an external processor 4 via a bus 5 and an interface (I/F) terminal. The interface circuit 310 writes the data thus received to the first memory 306 and the second memory 308. It should be noted that the interface circuit 310 may be used to receive other data to be used in other circuit blocks that differ from the protection circuit 30. The bus 5 is configured as a I²C bus, for example. The interface circuit 310 is configured to be capable of receiving serial data.

In the present embodiment, the protection circuit 30 is configured such that the write operation for writing the first setting data D1 to the first memory 306 is possible only when a predetermined condition is satisfied. That is to say, when the predetermined condition is not satisfied, the protection circuit 30 prohibits the write operation for writing the data to the first memory 306.

When the predetermined condition is satisfied, the state machine 312 is set to a permission mode. When the predetermined condition is not satisfied, the state machine 312 is set to a prohibition mode. The access of the processor 4 to the first memory 306 is permitted or otherwise prohibited according to the mode of the state machine 312.

The above is the configuration of the protection circuit 30. Next, description will be made regarding the condition in which the write operation to the first memory 306 is possible. In order to provide a state in which data writing to the first memory 306 is possible, it is necessary to switch the state machine 312 to the permission mode.

The state machine 312 is set to a prohibition mode in its default state. In this state, a permission flag FLG is negated (set to low level, for example). When the permission flag FLG is negated, the interface circuit 310 writes no data to the first memory 306 even if the interface circuit 310 receives the first setting data D1. In this case, the interface circuit 310 may transmit, to the processor 4, a notice that the state machine 312 is set to the prohibition mode.

The data write operation to the first memory 306 and the second memory 308 is preferably performed in an exclusive manner. That is to say, when the permission flag FLG is asserted, the write operation to the first memory 306 is permitted, and the write operation to the second memory 308 is prohibited. Conversely, when the permission flag FLG is negated, the write operation to the first memory 306 is prohibited, and the write operation to the second memory 308 is permitted.

Upon reception of predetermined control data D3 from the processor 4, the state machine 312 is switched to the permission mode. For example, the state machine 312 includes third memory 320 and a decoder 322. When the interface circuit 310 receives the control data from the processor 4, the interface circuit 310 writes the control data thus received to the third memory 320. The decoder 322 decodes the data D3 stored in the third memory 320. When the control data D3 satisfies a predetermined condition, the decoder 322 asserts the permission flag FLG that indicates the permission mode.

The state machine 312 may include a timer circuit (not shown). When the control data D3 satisfies a predetermined condition, the timer circuit may start a count operation. When the count value reaches a predetermined value, the state machine 312 may assert the permission flag FLG.

Only when the permission flag FLG is asserted, the interface circuit 310 writes the setting data thus received to the first memory 306.

The above is the configuration of the protection circuit 30. Next, description will be made regarding the operation thereof.

Figure 3A:
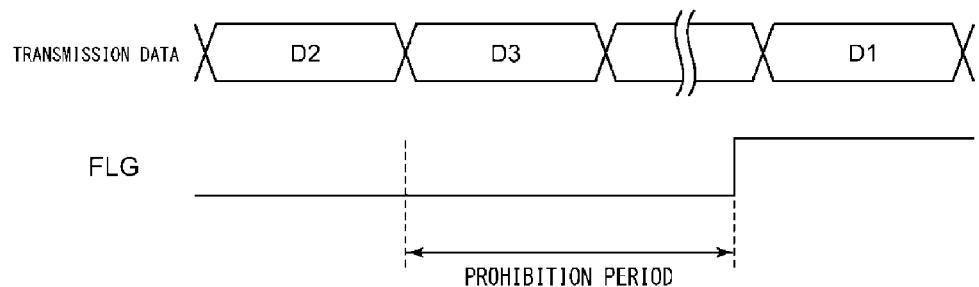
FIG. 3A is a diagram showing data transmission from a processor to the protection circuit shown in FIG. 2.
Figure 3B:
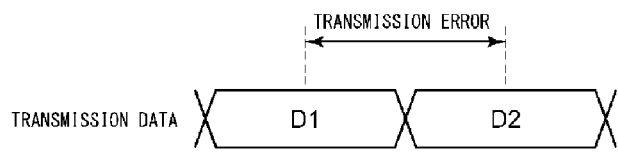
FIG. 3B is a diagram showing data transmission from the processor to the overcurrent protection circuit shown in FIG. 1.

FIG. 3A is a diagram showing data transmission from the processor 4 to the protection circuit 30 shown in FIG. 2. FIG. 3B is a diagram showing data transmission from the processor 4 to the overcurrent protection circuit 40 shown in FIG. 1. In order to clarify the advantages of the protection circuit 30 shown in FIG. 2, first, description will be made with reference to FIG. 3B regarding the overcurrent protection circuit 40 shown in FIG. 1.

Figure 1:
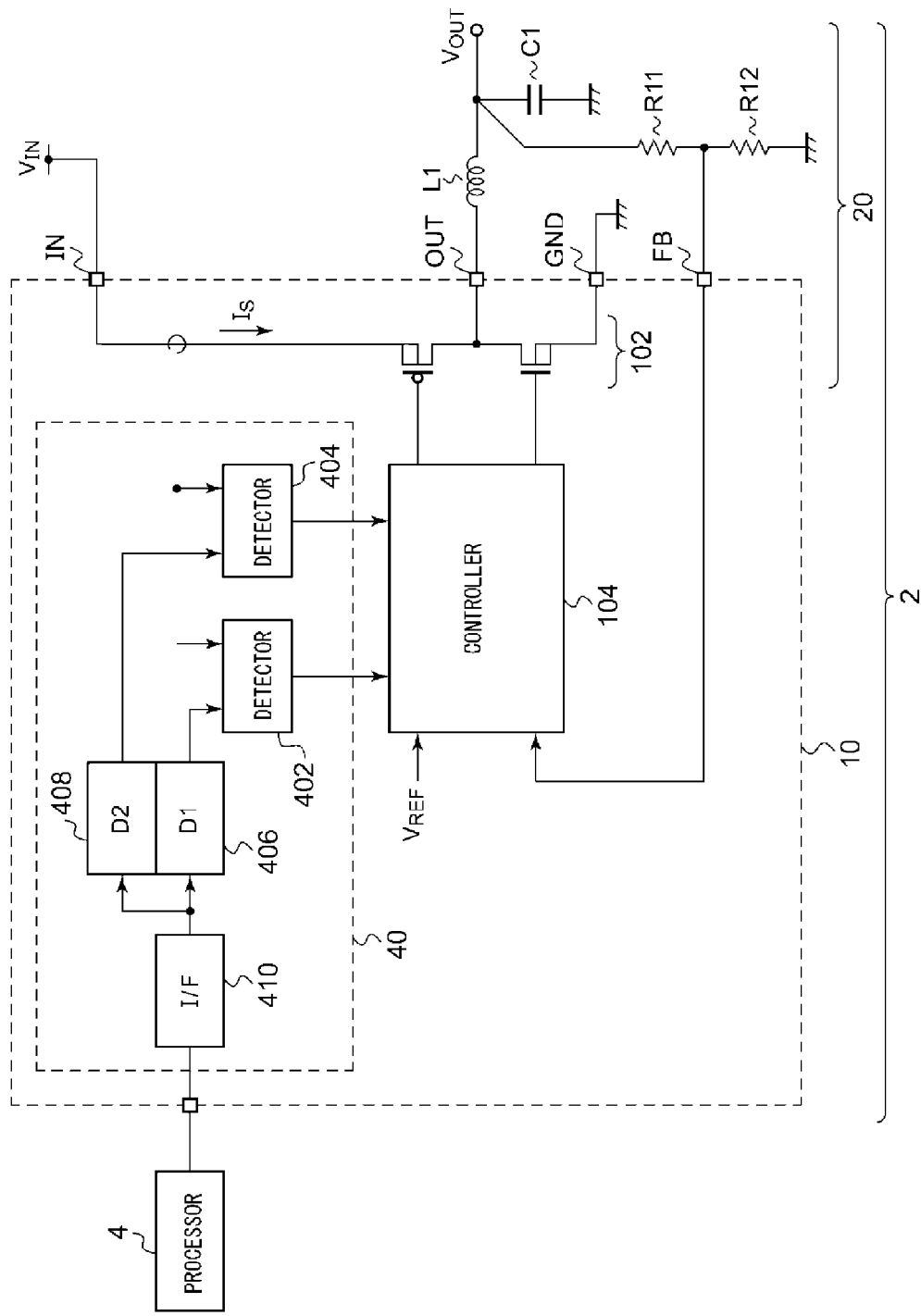
FIG. 1 is a circuit diagram showing a protection circuit investigated by the present inventors.

With the overcurrent protection circuit 40 shown in FIG. 1, there is no restriction on the data write operation of the processor 4 for writing data to the memory 406 and 408. Accordingly, as shown in FIG. 3B, such an arrangement is capable of writing two setting data D1 and D2 in a seamless writing sequence. If transmission error occurs over a certain period in the writing sequence, both the setting data D1 and D2 are destroyed. In this case, all the overcurrent detection functions are completely lost.

Next, description will be made with reference to FIG. 3A regarding the operation of the protection circuit 30 shown in FIG. 2.

In the initial state, the state machine 312 is set to the prohibition mode in which the permission flag FLG is negated. In this state, the processor 4 writes the second setting data D2 to the second memory 308. Next, in order to switch the state machine 312 to the permission mode, the processor 4 transmits the control data D3 to the state machine 312. Upon reception of the control data D3, the state machine 312 switches to the permission mode in which the permission flag FLG is asserted. After the permission flag FLG is asserted, the processor 4 writes the first setting data D1 to the first memory 306.

That is to say, the data write operation of the processor 4 for writing the setting data D1 is prohibited for a prohibition period after the processor 4 writes the second setting data D2. The above is the operation of the protection circuit 30 shown in FIG. 3.

With the protection circuit 30, such an arrangement is capable of prohibiting the processor 4 from writing the setting data D1 and D2 to the first memory 306 and the second memory 308 at the same time. Thus, such an arrangement is capable of preventing the two setting data D1 and D2 from both being written as false values due to a single error-generating factor. Such an arrangement is capable of preventing the two detectors 302 and 304 from losing their functions at the same time, thereby providing improved robustness.

For example, let us consider a case in which transmission error occurs over the same period as shown in FIG. 3B. In this case, the second setting data D2 and the control data D3 are destroyed. When the control data D3 is destroyed, the state machine 312 does not switch to the permission mode. That is to say, the state machine 312 remains in the prohibition mode. In this case, the processor 4 again outputs the control data D3 to the state machine 312 so as to switch the state machine 312 to the permission mode. After the state machine 312 is switched to the permission mode, the processor 4 writes the first setting data D1 to the first memory 306. That is to say, there is a high probability of the first setting data D1 being written normally even if the second setting data D2 has been destroyed. Thus, such an arrangement is capable of protecting at least one detection function in its effective state.

It should be noted that, before the processor 4 writes the second setting data D2 to the second memory 308, it is necessary to perform two steps comprising: a first step in which the second memory 308 is addressed; and a second step in which the second setting data D2 is transmitted to the second memory 308. On the other hand, before the processor 4 writes the first setting data D1 to the first memory 306, it is necessary to perform four steps comprising: a first step in which the third memory 320 is addressed; a second step in which the control data D3 is transmitted to the third memory 320; a third step in which the first memory 306 is addressed; and a fourth step in which the first setting data D1 is transmitted to the first memory 306. That is to say, the protection circuit 30 is regarded as a circuit configured to instruct the processor 4 to perform processing that is changed according to whether data writing is performed for the first memory 306 or the second memory 308.

[Usage]

Figure 4:
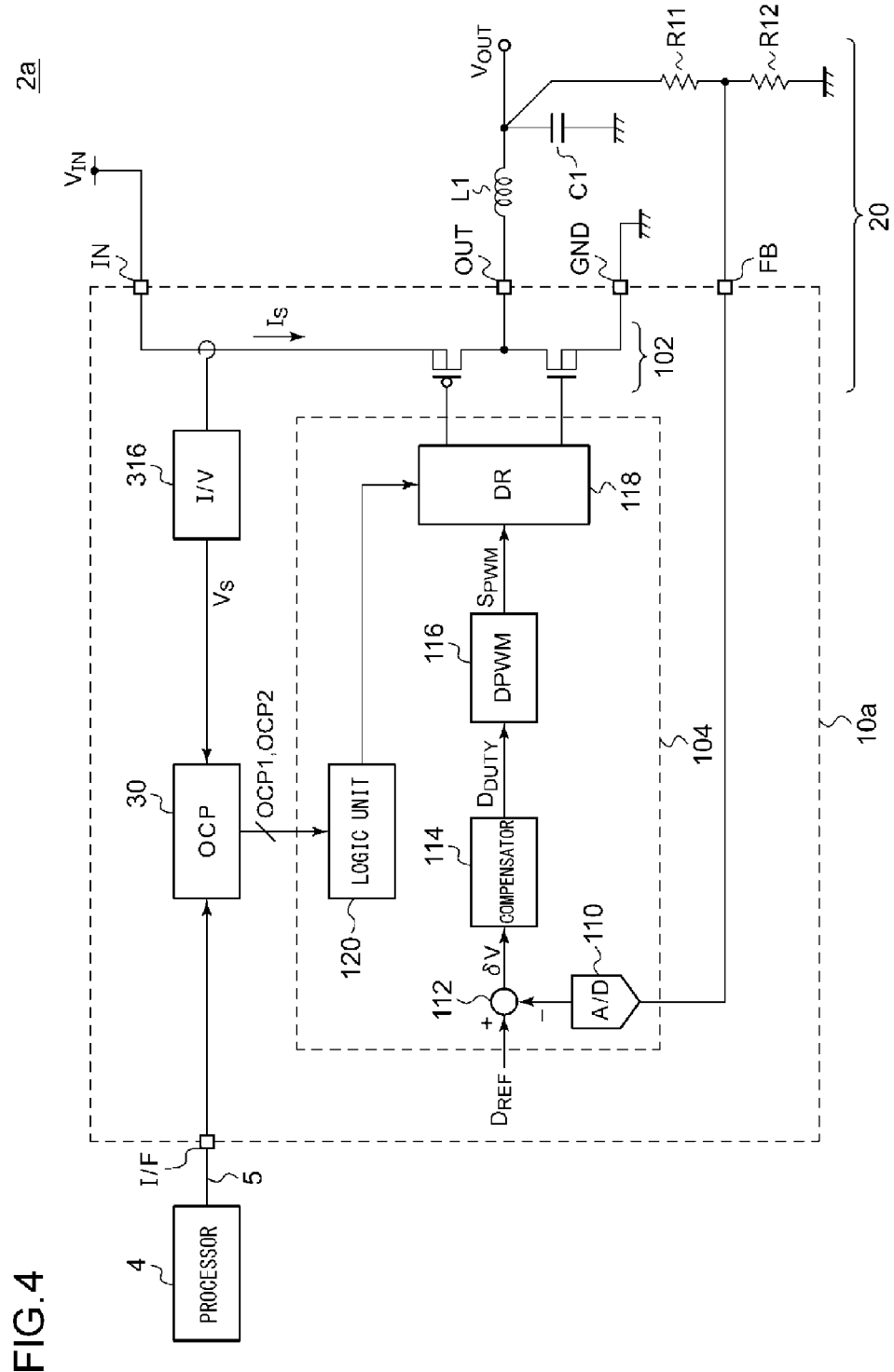
FIG. 4 is a circuit diagram showing a control circuit of a power supply circuit including a protection circuit.

Next, description will be made regarding the usage of the protection circuit 30. FIG. 4 is a circuit diagram showing a control circuit 10a of a power supply circuit 2a including the protection circuit 30. The protection circuit 30 is configured as an overcurrent protection circuit. For example, the controller 104 is configured as a controller for a digital control power supply.

The controller 104 includes an A/D converter 110, an error detector 112, a compensator 114, a digital pulse modulator 116, a driver 118, and a logic unit 120. The A/D converter 110 converts a feedback voltage $V_{FB}$ into a digital value $D_{FB}$. The error detector 112 calculates the difference $\delta V$ between the target value $D_{REF}$ and the digital value $D_{FB}$. The compensator 114 generates a duty instruction value $D_{DUTY}$ that is adjusted such that the difference $\delta V$ approaches zero. The compensator 114 may perform a PI control operation or otherwise a PID control operation. The digital pulse modulator 116 generates a pulse signal $S_{PWM}$ having a duty ratio that corresponds to the duty instruction value $D_{DUTY}$. The driver 118 drives a switching circuit 102 according to the pulse signal $S_{PWM}$.

An I/V converter 316 detects a current $I_S$ that flows through the switching circuit 102, and converts the current $I_S$ thus detected into a voltage $V_S$. The voltage $V_S$ (current $I_S$) is input to the protection circuit 30 as an electric signal to be monitored. When the current $I_S$ exceeds a first threshold TH1, the protection circuit 30 asserts an overcurrent protection signal OCP1. When the current $I_S$ exceeds a second threshold TH2, the protection circuit 30 asserts an overcurrent protection signal OCP2. The logic unit 120 controls the driver 118 such that the operation of the switching circuit 102 is suspended according to the protection signals OCP1 and OCP2.

Figure 5:
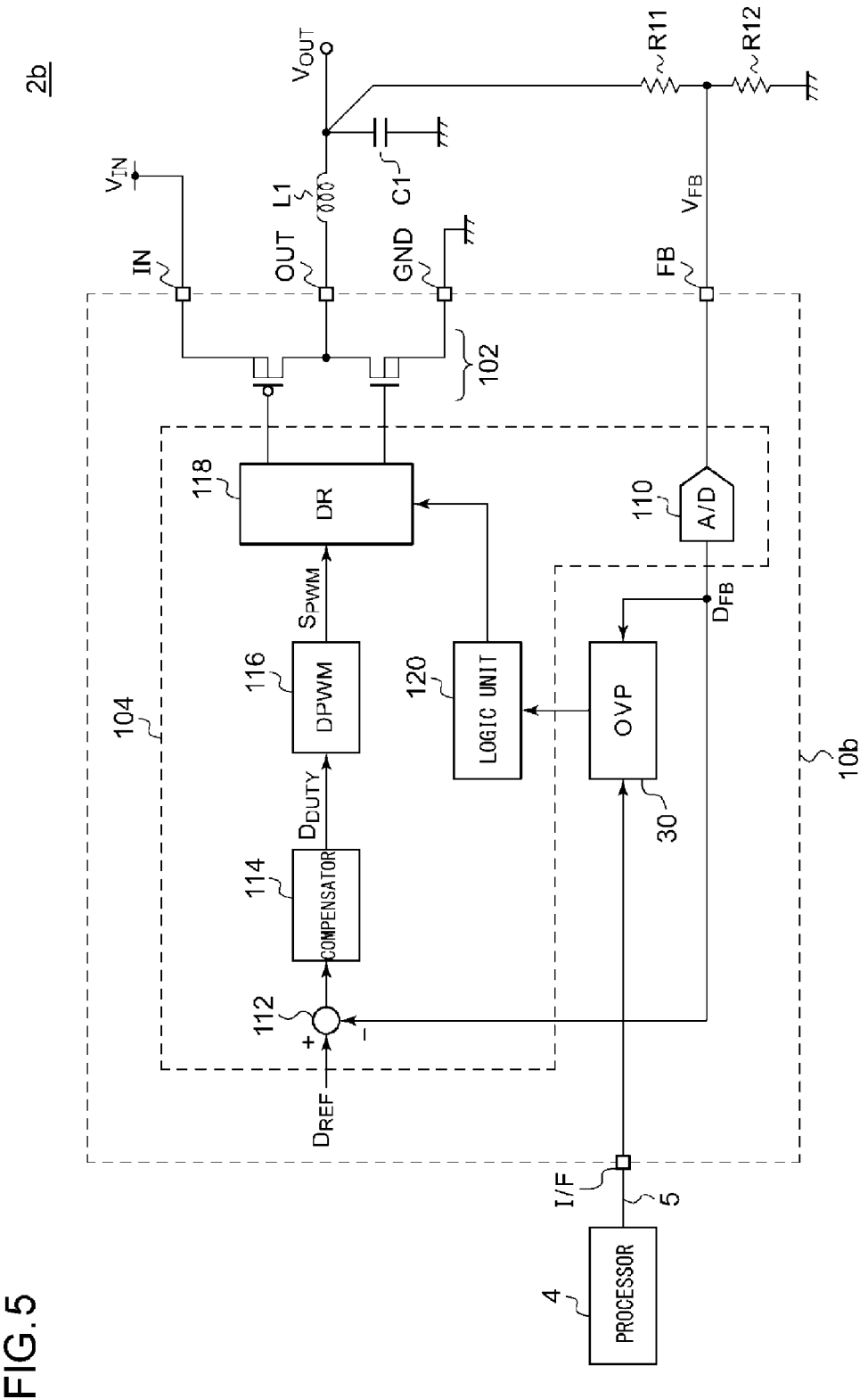
FIG. 5 is a circuit diagram showing a control circuit of a power supply circuit including a protection circuit.

FIG. 5 is a circuit diagram showing a control circuit 10b of a power supply circuit 2b including the protection circuit 30. The protection circuit 30 is configured as an overvoltage protection circuit.

The protection circuit 30 receives an output $D_{FB}$ (voltage $V_{FB}$) of an A/D converter 110 as an electric signal to be monitored. The A/D converter 314 shown in FIG. 2 corresponds to the A/D converter 110 shown in FIG. 5.

When the voltage $V_{FB}$ exceeds a first threshold TH1, the protection circuit 30 asserts an overvoltage protection signal OVP1. When the voltage $V_{FB}$ exceeds a second threshold TH2, the protection circuit 30 asserts an overvoltage protection signal OVP2. The logic unit 120 controls the driver 118 such that the operation of the switching circuit 102 is suspended according to the protection signals OVP1 and OVP2.

As described above, the protection circuit 30 is suitably employed as an overcurrent protection circuit or an overvoltage protection circuit for a switching power supply.

[System]

Figure 6A:
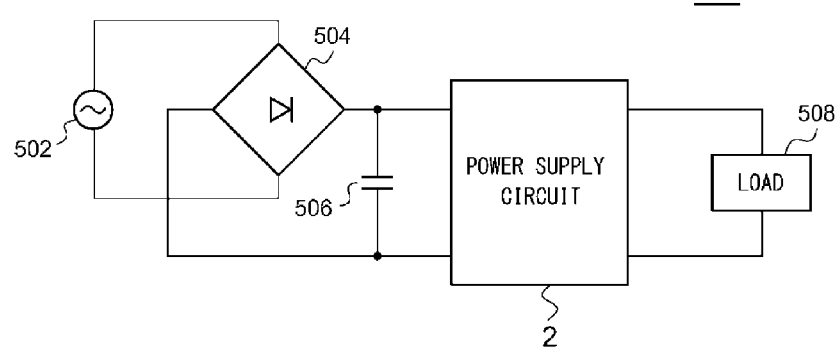
FIGS. 6A and 6B are block diagrams each showing an electronic device including a power supply circuit.
Figure 6B:
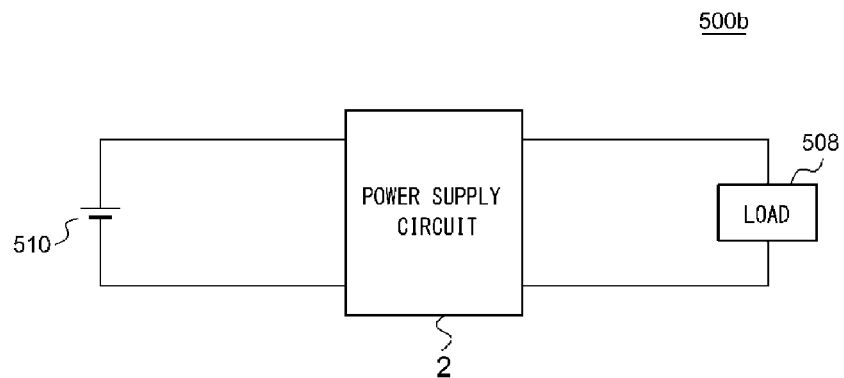

Lastly, description will be made regarding the usage of the power supply circuit 2. FIGS. 6A and 6B are block diagrams each showing an electronic device including the power supply circuit 2. An electronic device 500a shown in FIG. 6A includes a bridge circuit 504 that rectifies an AC voltage received from a commercially available AC power supply 502, a smoothing capacitor 506, the aforementioned power supply circuit 2, and a load 508. In this case, as such a power supply circuit 2, a non-insulated or otherwise insulated step-down, step-up, or otherwise step-up/step-down converter may be preferably employed. Examples of such an electronic device 500a include mobile communication base stations, consumer electronics devices such as TVs, refrigerators, etc., OA devices such as faxes, copiers, etc., machine tools, and the like.

An electronic device 500b shown in FIG. 6B includes a battery 510, the aforementioned power supply circuit 2 that receives the voltage from the battery, and a load 508. Examples of such an electronic device 500b include a cellular phone terminal, tablet PC, digital still camera, digital video camera, and the like. For example, the load 508 may be configured as a microcomputer, memory, a liquid crystal driver, a liquid crystal backlight LED, a camera flash LED, or the like.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Figure 7:
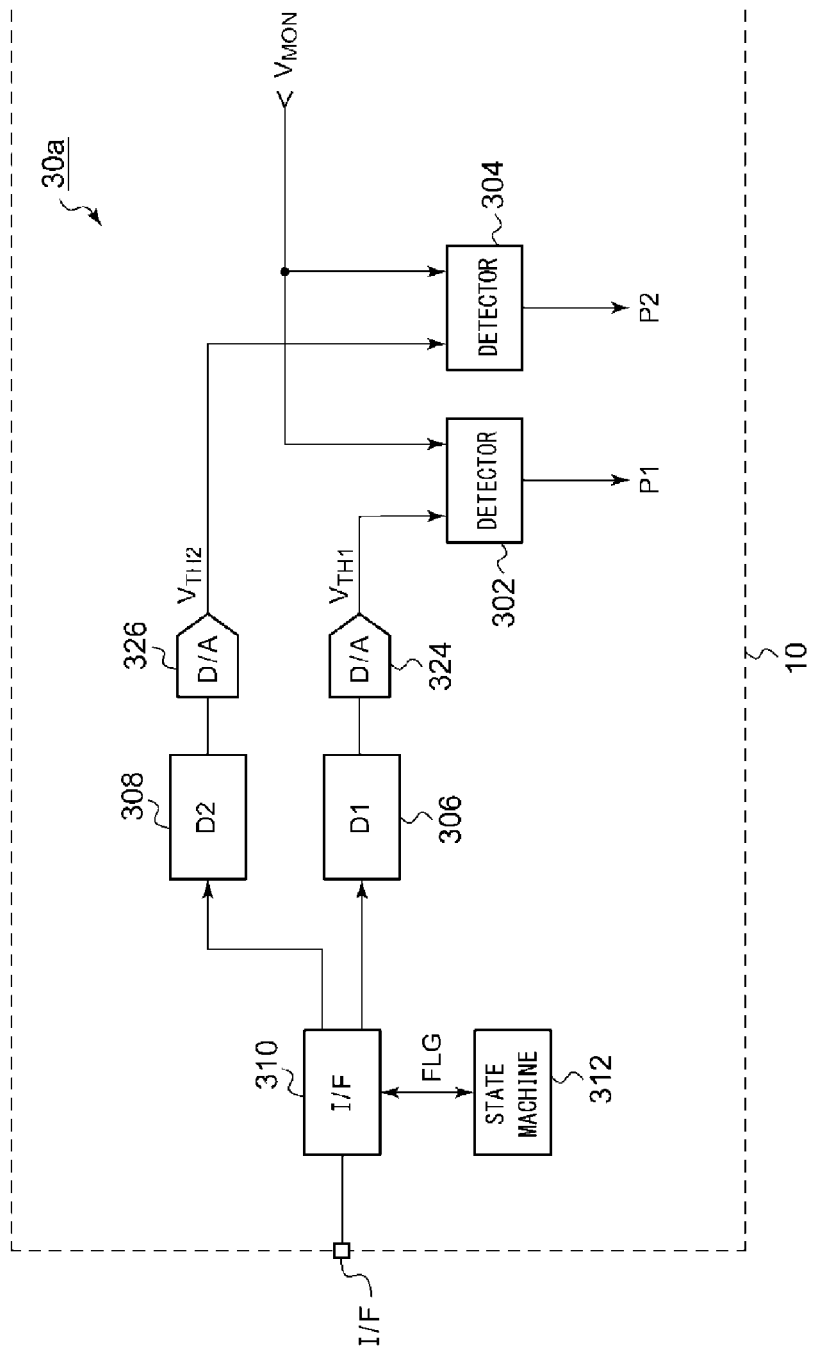
FIG. 7 is a circuit diagram showing a protection circuit according to a first modification.

FIG. 7 is a circuit diagram showing a protection circuit 30a according to a first modification. In the modification, the first detector 302 and the second detector 304 each make a comparison in an analog manner. The protection circuit 30a shown in FIG. 7 includes a first D/A converter 324 and a second D/A converter 326 instead of the A/D converter 314 included in the protection circuit 30 shown in FIG. 2. The D/A converters 324 and 326 convert the setting data D1 and D2 into analog threshold voltages $V_{TH1}$ and $V_{TH2}$, respectively. The detector 302 compares an analog electric signal $V_{MON}$ with the threshold voltage $V_{TH1}$. The detector 304 compares the analog electric signal $V_{MON}$ with the threshold voltage $V_{TH2}$. Such a modification also provides the same advantages as those provided by the protection circuit 30 shown in FIG. 2.

Second Modification

Description has been made in the embodiment regarding an arrangement in which the condition for switching to the permission mode is whether or not the processor 4 writes the control data D3. However, the present invention is not restricted to such an arrangement. Rather, with the present invention, various kinds of conditions may be employed for switching to the permission mode.

For example, the state machine 312 may switch to the permission mode after a predetermined waiting time τ when the processor 4 writes the setting data D2 to the second memory 308. The designer of the device on which the processor 4 and the protection circuit 30 are mounted has information with respect to the waiting time τ. Thus, the designer designs the processor 4 such that the processor 4 writes the first setting data D1 after the waiting time τ elapses after the second setting data D2 has been written.

With such a modification, by setting the waiting time to an appropriate value, such an arrangement provides the protection circuit with improved robustness.

Third Modification

Figure 8:
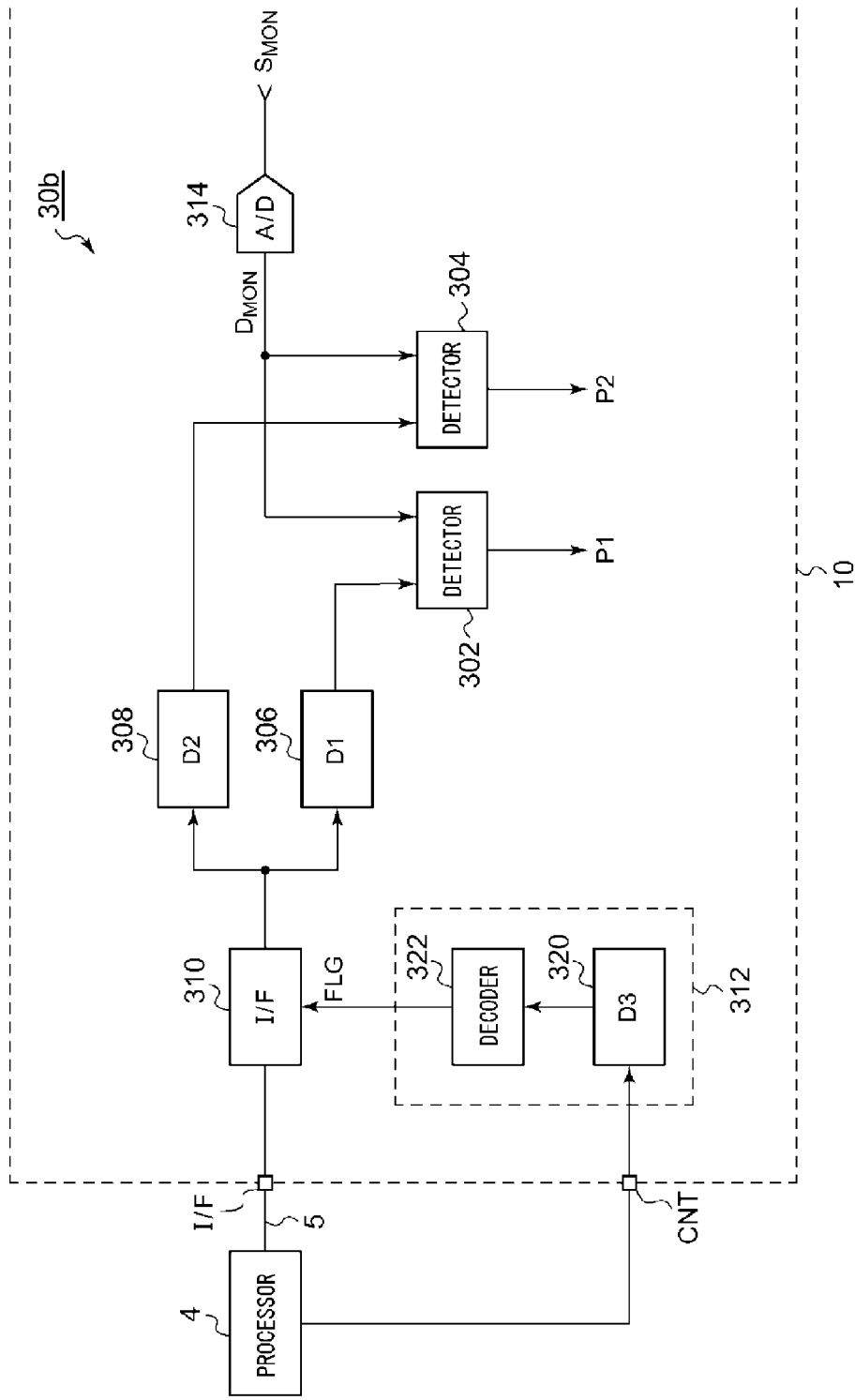
FIG. 8 is a circuit diagram showing a protection circuit according to a third modification.

FIG. 8 is a circuit diagram showing a protection circuit 30b according to a third modification. In this modification, the control data D3 to be used to switch the mode is input via a dedicated control line 6. The control data D3 may be configured as serial data or a binary control signal that switches between high level and low level. Such a modification provides the same advantages as those provided by the protection circuit 30 shown in FIG. 2.

Fourth Modification

Description has been made in the embodiment regarding a digital control power supply circuit for exemplary purposes. However, the present invention is not restricted to such an arrangement. Also, the present invention is applicable to an analog control power supply circuit. Also, the pulse modulation method is not restricted in particular. For example, the present invention is applicable to various kinds of pulse modulation such as a fixed on time method, fixed off time method, pulse frequency modulation method, etc.

Fifth Modification

Description has been made in the embodiment regarding the power supply circuit 2 configured as a step-down converter. However, the present invention is not restricted to such an arrangement. Also, the power supply circuit 2 may be configured as a step-up converter or a step-up/step-down converter. Also, the power supply circuit 2 may be configured as a forward converter or a flyback converter each employing a transformer. The circuit topology of the output circuit 20 may preferably be modified according to the configuration of the power supply circuit. In addition, the power supply circuit 2 is not restricted to a DC/DC converter. Also, the power supply circuit 2 may be configured as a linear regulator or a charge pump circuit.

Sixth Modification

The usage of the protection circuit 30 is not restricted to such a power supply circuit. For example, the protection circuit 30 may be applicable to various kinds of circuits such as secondary battery charger circuits, audio ICs, liquid crystal driver ICs, PMICs (power management IC), microcontrollers, interface circuits such as a USB (Universal Serial Bus) interface, etc.

Seventh Modification

Description has been made in the embodiment regarding an arrangement in which the first memory 306 and the second memory 308 are integrated on a single chip (semiconductor substrate). However, the present invention is not restricted to such an arrangement. Also, the first memory 306 and the second memory 308 may be respectively integrated on separate semiconductor substrates. Such an arrangement is capable of reducing the probability of the setting data D1 and D2 respectively stored in the first memory 306 and the second memory 308 both being destroyed at the same time due to external factors such as electromagnetic noise or cosmic rays.

The first memory 306 and the second memory 308 may be respectively subject to different power supply lines. Such an arrangement is capable of preventing the setting data D1 and D2 from being destroyed at the same time due to noise received via the power supply line or the ground line.

While the preferred embodiments of the present invention have been described using specific terms, such description is for illustrative purposes only, and it is to be understood that changes and variations may be made without departing from the spirit or scope of the appended claims.

What is claimed is:

1. A protection circuit comprising:
   a first detector that compares an electric signal to be monitored with a first threshold;
   a second detector that compares the electric signal with a second threshold;
   a first memory that stores a first setting data of the first threshold;
   a second memory that stores a second setting data of the second threshold; and
   an interface circuit that receives data from an external processor, and writes the data thus received to the first memory and the second memory,
   wherein, the protection circuit is configured to be selectable between a permission mode and a prohibition mode according to a control data from the external processor, and wherein in the permission mode, writing the first setting data to the first memory is permitted and writing the second setting data to the second memory is prohibited, and in the prohibition mode, writing the first setting data to the first memory is prohibited and writing the second setting data to the second memory is permitted, so that write operations to the first memory and the second memory occur exclusively.

2. The protection circuit according to claim 1, further comprising a state machine which is selectable between the permission mode and the prohibition mode.

3. The protection circuit according to claim 1, wherein the first memory and the second memory are laid out on a semiconductor substrate on which the protection circuit is integrated, such that the first memory and the second memory are physically distant from each other.

4. The protection circuit according to claim 1, wherein the first memory and the second memory are respectively integrated on separate semiconductor substrates.

5. The protection circuit according to claim 1, wherein the first memory and the second memory are respectively subject to different power supply lines.

6. The protection circuit according to claim 1, monolithically integrated on a single semiconductor substrate.

7. A control circuit for a switching power supply, comprising:
   a switching controller that controls a switching element of the switching power supply; and
   the protection circuit according to claim 1.

8. The control circuit according to claim 7, wherein the protection circuit is configured as an overcurrent protection circuit,
   and wherein the electric signal to be monitored by the protection circuit is a current that flows through the switching power supply.

9. The control circuit according to claim 7, wherein the protection circuit is configured as an overvoltage protection circuit,
   and wherein the electric signal to be monitored by the protection circuit is an output voltage of the switching power supply.

10. A power supply circuit comprising:
    an output circuit comprising at least a switching element, an inductor, and an output line that outputs a DC output voltage according to a switching operation of the switching element; and
    the control circuit according to claim 7, that controls the switching element according to the output voltage.

11. An electronic device comprising the power supply circuit according to claim 10.

12. A mobile communication base station comprising the power supply circuit according to claim 10.

13. A protection circuit comprising:
    a first detector that compares an electric signal with a first threshold;
    a second detector that compares the electric signal with a second threshold;
    a first memory that stores setting data of the first threshold;
    a second memory that stores setting data of the second threshold; and
    an interface circuit that receives data from an external processor, and writes the data thus received to the first memory and the second memory,
    wherein, the protection circuit is configured to be selectable between a permission mode and a prohibition mode according to a control data from the external processor, and wherein in the permission mode, writing the first setting data to the first memory is permitted and writing the second setting data to the second memory is prohibited, and in the prohibition mode, writing the first setting data to the first memory is prohibited and writing the second setting data to the second memory is permitted, so that write operations to the first memory and the second memory occur exclusively.

14. The A protection circuit according to claim 13, wherein the first memory and the second memory are laid out on a semiconductor substrate on which the protection circuit is integrated, such that the first memory and the second memory are physically distant from each other.

\* \* \* \* \*